Figures 1, 2:
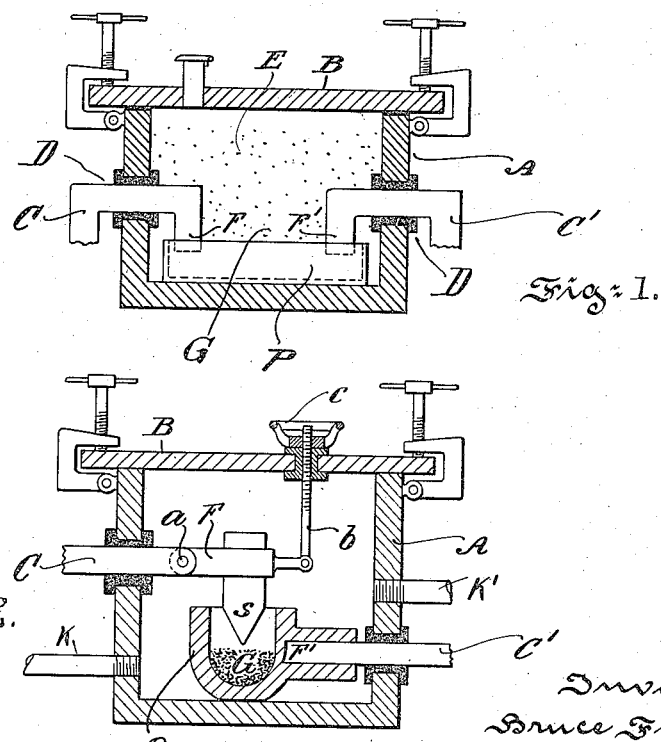

B. FORD.
METHOD OF CHANGING THE COMPOSITION OF IRON AND STEEL.
APPLICATION FILED APR. 13, 1905.

1,156,679.

Patented Oct. 12, 1915.

Witnesses:

Inventor:
Bruce Ford.
By
Augustus B. Stoughton
Atty.

UNITED STATES PATENT OFFICE.

BRUCE FORD, OF PHILADELPHIA, PENNSYLVANIA.

METHOD OF CHANGING THE COMPOSITION OF IRON AND STEEL.

1,156,679.  Specification of Letters Patent.  Patented Oct. 12, 1915.

Application filed April 13, 1905. Serial No. 255,359.

*To all whom it may concern:*

Be it known that I, BRUCE FORD, a citizen of the United States, and a resident of Philadelphia, in the county of Philadelphia and State of Pennsylvania, have invented certain new and useful Improvements in the Method of Changing the Composition of Iron and Steel, of which the following is a specification.

Case hardening or the carbureting of a mere surface skin has been accomplished by electrically or otherwise heating the metal and while hot rubbing the surface with a suitable steelifying material, such as potassium cyanid. This can be quickly accomplished, but it results in the production of a mere superficial film.

The principal object of the present invention is to provide an expeditious method for accurately controlling or changing the carbon contents and hardening constituents of iron and steel throughout the mass or to a substantial depth.

To this and other ends hereinafter set forth the invention comprises the improvements to be presently described and finally claimed.

The drawings illustrate types of apparatus which may be used for the practice of the process of the invention and in them—

Figure 1, is a diagrammatic view principally in section, and Fig. 2 is a similar view.

To practise the process of the invention the metal is immersed in a suitable carbureting medium and while permitted to remain or stay therein, is electrically heated in such a way that its body or mass is molten, and the metal remains exposed to these conditions until the composition of the whole of it is changed or until its composition is changed to a substantial depth which is a matter of, comparatively, a very short time, measurable in minutes or hours as distinguished from hours and days or even weeks. The temperature to which the body or mass of metal is heated can be accurately controlled and regulated during the entire period of time in which the metal remains immersed in or exposed to the medium.

For the sake of a further description an explanation of the method as practised in the apparatus shown will now be given.

A, is a receptacle as of cast iron preferably fitted with a removable cover B. Conductor bars C and C¹ lead into the receptacle A, but are insulated therefrom by the bushings D. Within the receptacle is the medium E, which may be either gas, vapor, liquid, or a granular or powdered mass.

F, F¹, are contact pieces for the conductors C, C¹ and between these there is an open receptacle P, of fire-clay or other suitable refractory substances in which the metal may be allowed to melt without breaking the continuity of the electric circuit. If the medium E is a gas or vapor it may be allowed to circulate by means of the inlet and outlet pipes K, K¹. The effect of this electric current is to heat to melting the mass or body of the metal G, whereupon it absorbs carbon or other hardening constituents from the medium in the manner described. Obviously the receptacle A, is not heated and therefore it is not affected, so that all of the constituents of the medium and all of the heat are available to the metal under treatment, the cover B being clamped as shown. For the sake of a further explanation it may be stated that for each square inch of cross-section of the metal to be treated there is required approximately 2,000 to 10,000 amperes and for each foot in length of the metal to be treated there is required from two to five volts according to the shape of its cross-section and the capacity of the medium for taking away heat.

In connection with the practice of the invention by means of the apparatus illustrated in Fig. 2, the metal to be treated is contained in an open receptacle Q, mounted in the receptacle A. This receptacle is made of some suitable material as graphite and is shown as connected to the terminal F¹ and conductor C¹. A suitable pole piece *s*, as of carbon is connected to the contact F, of conductor C, in such a way that an arc can be formed between the pole piece F and the metal G. In the construction shown, the contact F, is a hinged member pivoted at *a*, and the arc is made and adjusted by means of the rod and hand-wheel *b*, and *c*. The result of this is that the entire mass or body of the metal is heated and may be melted and is therefore affected in the manner described.

As an illustration of a carbonizing medium reference may be made to the fumes of gasolene, some appropriate form of cyanogen, ground carbon, lamp black, bone black or the like, or a mixture of these or some of these.

It will be obvious to those skilled in the art to which the invention relates that modifications may be made in details without departing from the spirit thereof, hence the invention is not limited further than the prior state of the art may require, but

Having thus described the nature and objects of my invention, what I claim as new and desire to secure by Letters Patent is:—

The method of carburizing iron and steel which consists in melting and liquefying the entire mass of the metal in a chamber from which air is excluded to prevent oxidizing the medium, covering the molten metal with a suitable medium adapted to give carbon to the metal absorptively, and applying electric energy to the body or mass of the metal sufficient to maintain the molten condition of the metal and until its composition is changed by such absorptive contact.

In testimony whereof I have hereunto signed my name.

BRUCE FORD.

Witnesses:
G. W. WOODWARD,
EDWARD G. STEINMETZ.